US008539456B2

(12) United States Patent
Supalov et al.

(10) Patent No.: US 8,539,456 B2
(45) Date of Patent: Sep. 17, 2013

(54) AUTOMATIC CONVERSION OF MPI SOURCE CODE PROGRAMS INTO MPI THREAD-BASED PROGRAMS

(75) Inventors: Alexander V. Supalov, Erfstadt (DE); Rob F. Van der Wijngaart, San Jose, CA (US); Stanley J. Whitlock, Merrimack, NH (US)

(73) Assignee: Intel Corporation, Santa Clara, CA (US)

( * ) Notice: Subject to any disclaimer, the term of this patent is extended or adjusted under 35 U.S.C. 154(b) by 930 days.

(21) Appl. No.: 12/459,314

(22) Filed: Jun. 30, 2009

(65) Prior Publication Data

US 2010/0333074 A1 Dec. 30, 2010

(51) Int. Cl.
*G06F 9/45* (2006.01)
(52) U.S. Cl.
USPC .......................................................... 717/136
(58) Field of Classification Search
USPC ........................................ 717/136–161, 163
See application file for complete search history.

(56) References Cited

U.S. PATENT DOCUMENTS

| | | | | |
|---|---|---|---|---|
| 5,249,133 A * | 9/1993 | Batra | ............................. | 716/112 |
| 5,535,393 A * | 7/1996 | Reeve et al. | ................... | 717/149 |
| 5,664,189 A * | 9/1997 | Wilcox et al. | ................ | 707/690 |
| 5,812,852 A * | 9/1998 | Poulsen et al. | ................ | 717/149 |
| 6,880,151 B2 * | 4/2005 | Abdelhadi et al. | ........... | 717/136 |
| 6,920,635 B1 * | 7/2005 | Lodrige et al. | ................ | 719/314 |
| 7,630,389 B1 * | 12/2009 | Alfieri et al. | ................. | 370/412 |
| 7,681,237 B1 * | 3/2010 | Spiegel et al. | ................... | 726/24 |
| 8,122,132 B2 * | 2/2012 | Arimilli et al. | ............... | 709/226 |
| 8,166,483 B2 * | 4/2012 | Chrabieh | ....................... | 718/103 |
| 2004/0068715 A1 * | 4/2004 | Wong et al. | ..................... | 717/136 |
| 2006/0294312 A1 * | 12/2006 | Walmsley | ...................... | 711/122 |
| 2007/0294671 A1 * | 12/2007 | Demetriou et al. | ........... | 717/124 |
| 2007/0294680 A1 * | 12/2007 | Papakipos et al. | ............ | 717/149 |
| 2009/0064167 A1 * | 3/2009 | Arimilli et al. | ............... | 718/105 |
| 2009/0077011 A1 * | 3/2009 | Natarajan et al. | ................. | 707/2 |
| 2009/0198968 A1 * | 8/2009 | Penfold | ......................... | 712/216 |
| 2009/0235262 A1 * | 9/2009 | Ceze et al. | .................... | 718/102 |

OTHER PUBLICATIONS

Tang et al., Program Transformation and Runtime Support for Threaded MPI Execution on Shared-Memory Machines, Jul. 2000, ACM Transactions on Programming Languages and Systems, vol. 22, No. 4, pp. 673-700.*
Tang et al.,Compile Runtime Support for Threaded MPI Execution on Multiprogrammed Shared Memory Machines, Dec. 1998.*

(Continued)

*Primary Examiner* — Anna Deng
(74) *Attorney, Agent, or Firm* — Trop, Pruner & Hu, P.C.

(57) ABSTRACT

A method, system, and computer program product containing instructions for automatically converting an MPI source code program into an MPI thread-based program. In response to inputs in the form of an MPI source code program and a command, a converter declares a global variable of the MPI source code program as a thread private variable to create a first private variable for a first thread and a second private variable for a second thread. A library is identified to support converting processes to threads during execution of the MPI thread-based program, and the identified library is used to build an executable version of the MPI thread-based program. The identified library may include code to identify instantiation of a new process when the MPI thread-based program is executing, and in response, to cause a corresponding thread for the MPI thread-based program to be instantiated.

24 Claims, 5 Drawing Sheets

(56) References Cited

OTHER PUBLICATIONS

European Patent Office, Communication pursuant to Article 94(3) EPC dated Dec. 23, 2010 in European application No. 10 251 175.5-1243.

Hang Tang, et al., "Program Transformation and Runtime Support for Threaded MPI Execution on Shared Memory Machines," Jan. 2000, pp. 999-1025.

Japanese Office Action, Notice of Reasons for Rejection mailed May 29, 2012 in Japanese application No. 2010-140737.

* cited by examiner

AUTOMATIC CONVERSION OF MPI SOURCE CODE PROGRAMS INTO MPI THREAD-BASED PROGRAMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to automatic conversion of computer programs to be run in a message passing infrastructure.

BACKGROUND

Many computational problems can be subdivided into independent or loosely-dependent tasks, which can be distributed among a group of processors or systems and executed in parallel. This technique often permits the main problem to be solved faster than would be possible if all the tasks were performed by a single processor or system. Sometimes, the processing time can be reduced proportionally to the number of processors or systems working on the sub-tasks. Each process can compute independently except when it needs to exchange data with another task.

Cooperating processors and systems can be coordinated as necessary by transmitting messages between them. Messages can also be used to distribute work and to collect results. Some partitions or decompositions of problems can place significant demands on a message passing infrastructure, either by sending and receiving a large number of messages, or by transferring large amounts of data within the messages.

Messages may be transferred from process to process over a number of different communication channels, or "fabrics." For example, processes executing on the same physical machine may be able to communicate efficiently using shared memory or point-to-point processor interconnections on multi-processor machines. Processes on different machines may communicate through a high-speed network such as InfiniBand® (a registered trademark of the InfiniBand Trade Association), Myrinet® (a registered trademark of Myricom, Inc. of Arcadia, Calif.), Scalable Coherent Interface ("SCI"), or QSNet by Quadrics, Ltd. of Bristol, United Kingdom. These networks may provide a native operational mode that exposes all of the features available from the fabric, as well as an emulation mode that permits the network to be used with legacy software. Processes may also communicate via traditional networks such as Ethernet.

A standard set of message passing functions may be defined, and libraries provided to perform the standard functions over each type of fabric. The Message Passing Interface ("MPI") is an industry standard defining the basic application programming interface (API) for programming distributed memory and shared memory systems in terms of message passing. The MPI standard was defined by the members of the MPI Forum (see MPI: A Message-Passing Interface Standard Version 2.1, Message Passing Interface Forum, Jun. 23, 2008, available at xwwwx.mpi-forum.org/docs/, where "www" is replaced with "xwwwx" in the URL to avoid an active link from within this document). An MPI (or similar) library may provide the standard functions over one or more fabrics.

Multiple threads within a process are sometimes used to share resources such as memory, having an advantage that the threads do not require the use of message-passing mechanisms to communicate. Threads are especially useful in taking advantage of the different processor cores in multiprocessor systems. Operating systems in multiprocessor systems can allocate tasks among threads running on the different processor cores and take advantage of the data sharing that is possible for threads running within a common address space and with the processor interconnections available within the multiprocessor environment.

Within an MPI environment, however, multiple threads within one process are required to follow special implementation techniques. Under the MPI standard, each MPI process is typically mapped to a unique operating system process. A process's address space can only be accessed by another process by calling MPI library functions. As pointed out in the MPI-2 specification, section 12.4 "MPI and Threads," each thread within a process can issue MPI calls; however, threads are not separately addressable because the parameters in a send or receive call identify a process, not a thread. A message sent to a process can be received by any thread in this process. The fact that a process is multi-threaded does not affect the external interface of the process.

To comply with the MPI standard, as stated in the MPI-2 specification, section 12.4 "MPI and Threads," a thread-compliant implementation must ensure that all MPI calls are thread-safe and that blocking MPI calls block the calling thread only, allowing other threads to execute, if available. However, to meet this standard requires static and global variables used by threads making MPI calls to be protected using, for example, mutual exclusion primitives that allow access by only one thread at a time. A thread-compliant implementation typically requires a source code program to be rewritten by a programmer using techniques such as Posix threads or in accordance with a mixed MPI/OpenMP standard. These sophisticated programming paradigms increase program complexity and may decrease overall program performance. Such an implementation would eliminate one of the advantages of using threads, which can use static and global variables to communicate without the overhead of sending messages through a shared memory mechanism.

DETAILED DESCRIPTION

Embodiments of the present invention include a scheme to automatically convert an MPI source code program into an MPI thread-based program. The MPI thread-based program can take advantage of the faster data transfer capabilities of threads without compromising the ability to take advantage of other MPI functionality. In addition, by converting non-threaded MPI programs automatically into MPI thread-based programs, many legacy MPI programs that heretofore were unable to take advantage of multiprocessor environments can be converted automatically without programmer involvement. This automatic conversion can enable companies to automatically and inexpensively port their MPI source code program inventory to multiprocessor environments.

In response to inputs in the form of an MPI source code program and a command, a converter declares a global variable of the MPI source code program as a thread private variable to create a first private variable for a first thread and a second private variable for a second thread. A library is identified to support converting processes to threads during execution of the MPI thread-based program, and the identified library is used to build an executable version of the MPI thread-based program. The identified library may include code to identify instantiation of a new process when the MPI thread-based program is executing, and in response, to cause a corresponding thread for the MPI thread-based program to be instantiated. Data can be transferred from one thread to another by providing contents of the thread's respective private variable corresponding to the global variable directly to the other thread. This data transfer does not use a shared memory segment to transfer the data between threads.

Figure 1:
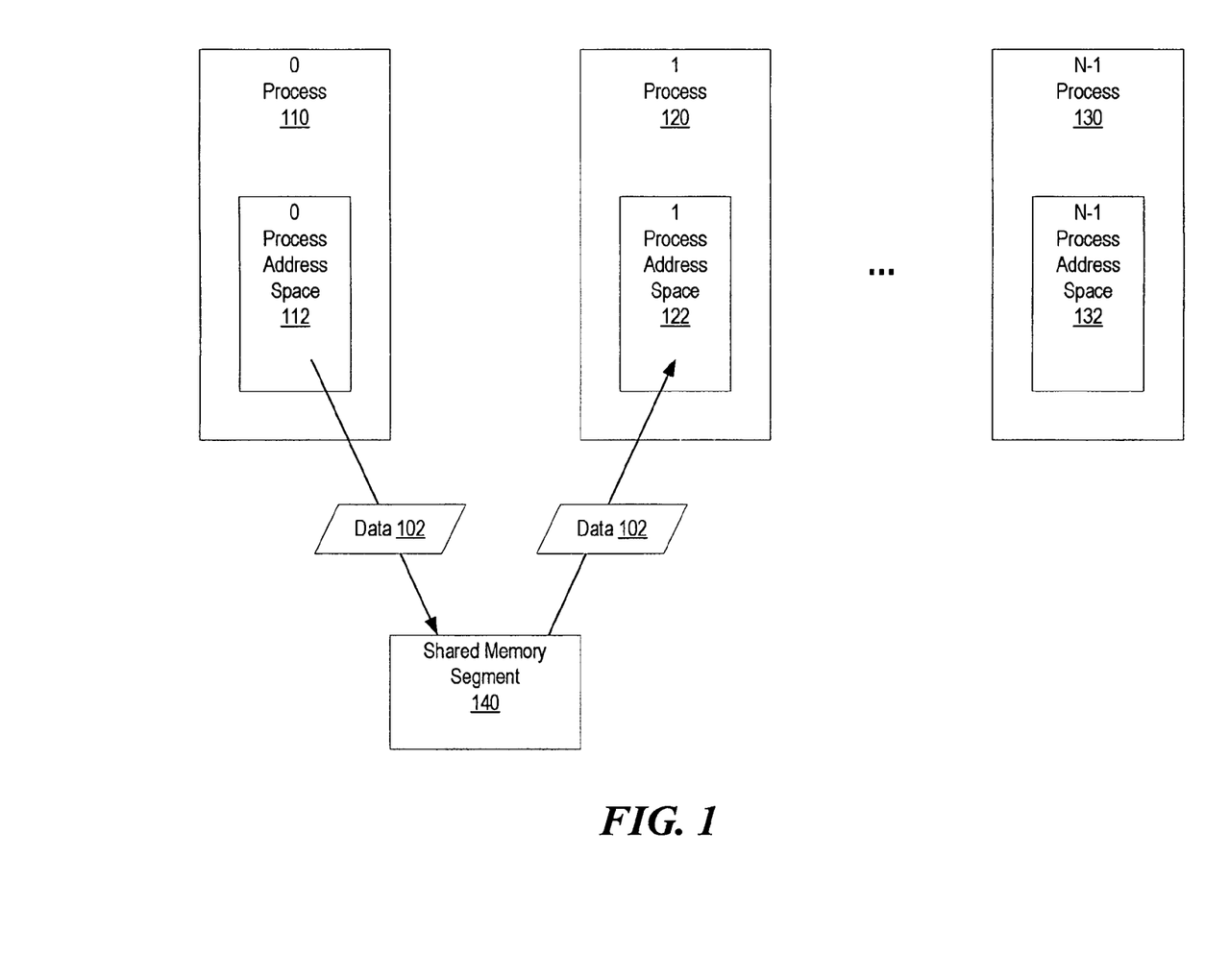
FIG. 1 shows data transfer between processes running in an MPI infrastructure using a shared memory segment.

FIG. 1 shows data transfer between processes running in an MPI infrastructure using a shared memory segment. In a typical implementation, an MPI program instantiates n processes 0 through n−1, shown in FIG. 1 as processes 110, 120, and 130. Each of these processes has its own respective address space, with process 110 having process address space 112, process 120 having process address space 122, and process 130 having process address space 132. To transfer data 102 from process 110 to process 120, data 102 must be transferred by process 110 from process address space 112 to shared memory segment 140, and then data 102 must be copied by process 120 from shared memory segment 140 into process address space 122. This data transfer operation requires two memory copy operations.

Shared memory segment 140 is shared between processes and may be a portion of a larger main memory to which access by different processes is coordinated. Access to shared memory 140 may be controlled using inter-process communication, where one process creates an area in random access memory that other processes can access, or by directing accesses to what would ordinarily be copies of a piece of data to a single instance by using virtual memory mappings. The coordinated access to shared memory 140 may be provided by resources such as an operating system and/or virtualization software.

Figure 2:
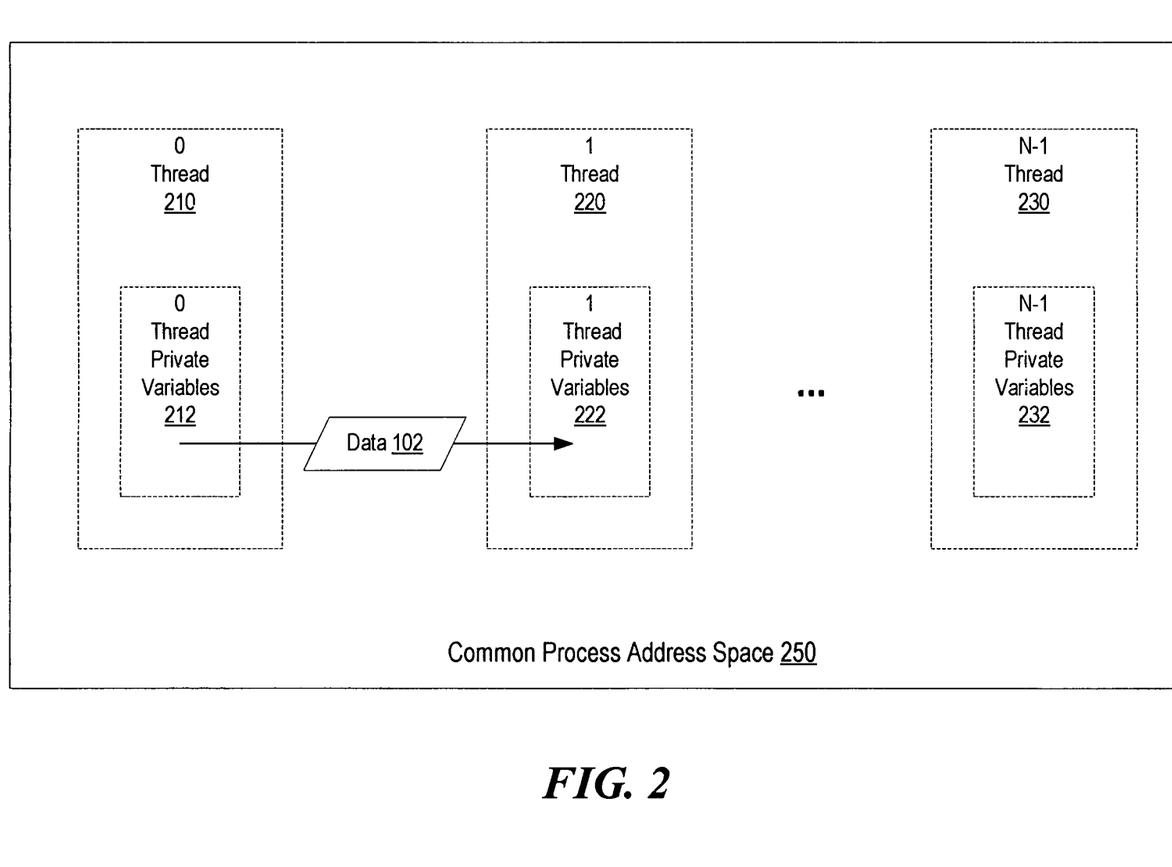
FIG. 2 illustrates data transfer between processes converted to threads in accordance with one embodiment of the invention.

FIG. 2 shows data transfer between processes converted to threads in accordance with one embodiment of the invention. The n processes 0 through n−1 are instantiated as threads 0 through n−1 within a common process address space 250. Each of threads 210, 220, and 230 has a respective set of private variables, with thread 210 having private variables 212, thread 220 having private variables 222, and thread 230 having private variables 232. To accomplish the transfer of data 102 from thread 210 to thread 220, data 102 can be transferred directly from an address within private variables 212 to an address within private variables 222. This data transfer can be performed directly rather than indirectly through a shared memory segment such as shared memory segment 140 of FIG. 1 because addresses within common process address space 250 are shared by the threads 210, 220, and 230. Performing a direct transfer rather than requiring two copy operations provides an immediate increase in performance of the program.

Figure 3:
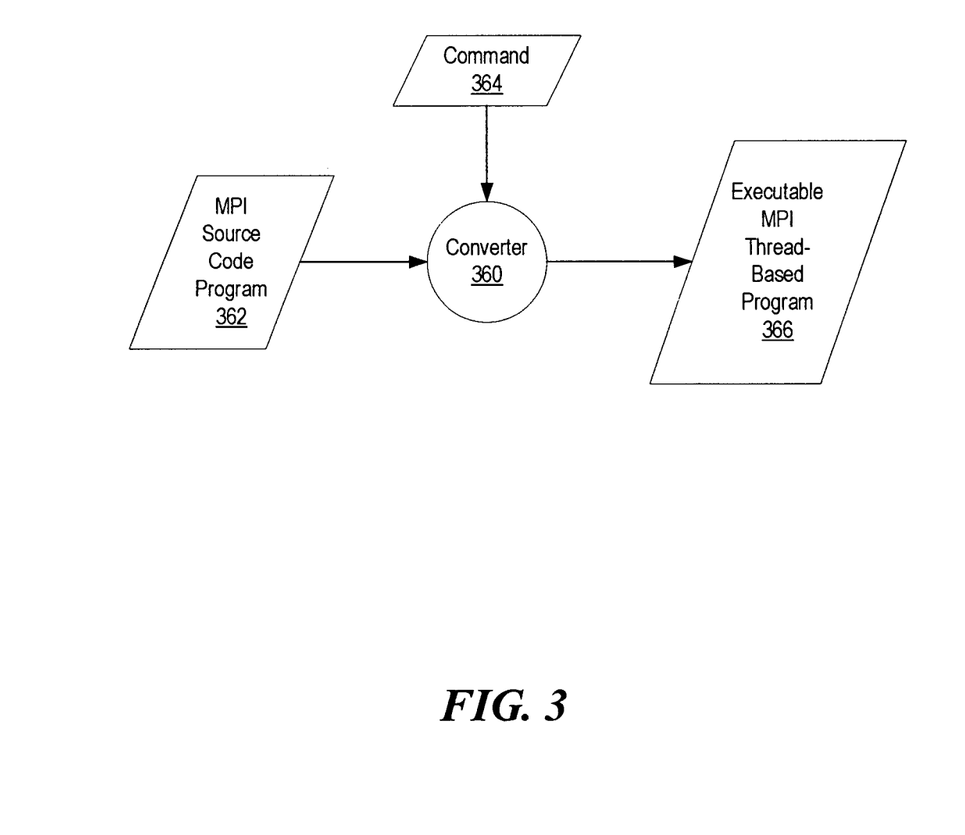
FIG. 3 is a flow diagram showing the operation of a converter of an MPI source code program to an MPI thread-based program in accordance with one embodiment of the invention.

FIG. 3 is a flow diagram showing the operation of a converter of an MPI source code program to an executable MPI thread-based program in accordance with one embodiment of the invention. Converter 360 takes as input an MPI source code program 362 and a command 364 and provides as output an executable MPI thread-based program 366. Command 364 may be, for example, a command to converter 360 to compile the MPI source-based program as an MPI thread-based program. For example, assume that a compiler is invoked with the following command to compile the source code program test.c: $ mpicc-o test_mpi_process test.c. After compiling test.c in response to this command, the output program test_mpi_process will execute as a conventional MPI application based upon processes. In contrast, the converter of the present invention is invoked with a command similar to the following to compile the source code program test.c: $ mpicc-mpi_on_threads-o test test_mpi_thread test.c. The portion of the command-mpi_on_threads provides the command to the compiler to produce the output program test_mpi_thread as an executable MPI thread-based program.

In response to the command 364, converter 360 declares a global variable of the MPI source code program as a thread private variable to create a first private variable for a first thread and a second private variable for a second thread. As used herein, the term "global variable" is used to describe a variable that has global scope within a process, such as a variable that is declared as a global or static variable. When MPI thread-based program 366 is executed, data can be transferred from one thread to another by providing contents of the thread's respective private variable corresponding to the global variable directly to the other thread. This data transfer does not use a shared memory segment to transfer the data between threads. MPI thread-based program 366 can take advantage of the faster data transfer capabilities of threads without compromising the ability to take advantage of other MPI functionality.

Figure 4:
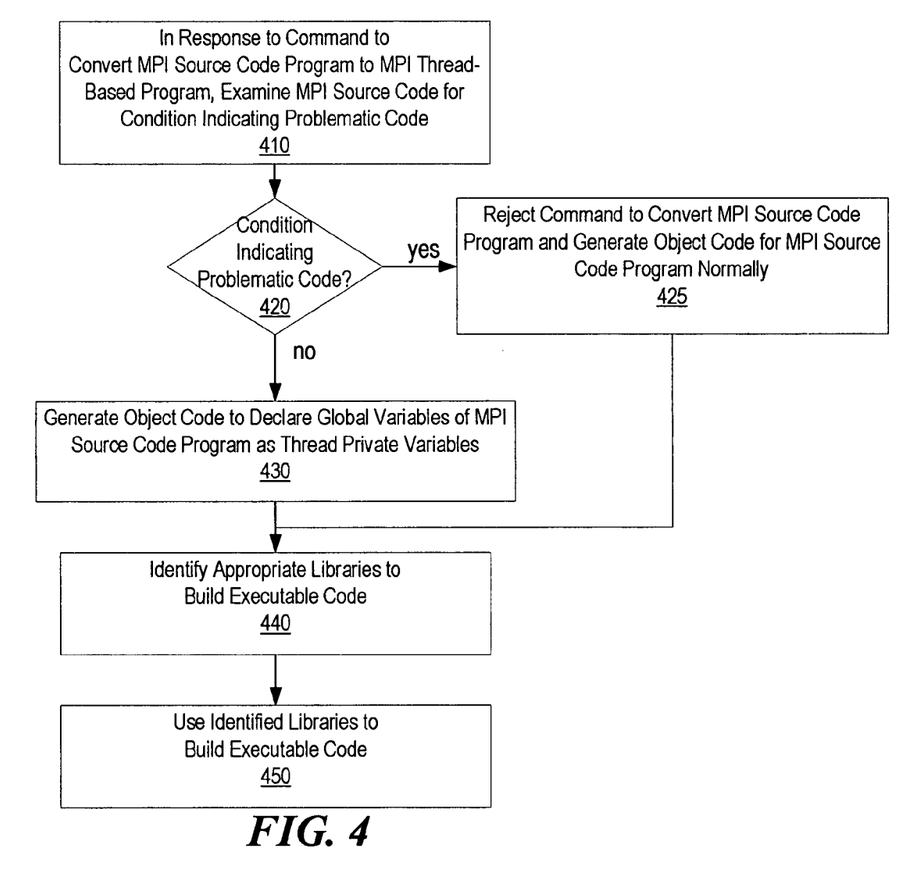
FIG. 4 is a flowchart of the operation of the converter of FIG. 3 in accordance with one embodiment of the invention.

FIG. 4 is a flowchart of the operation of the converter of FIG. 3 in accordance with one embodiment of the invention. As mentioned above, converter 360 receives as input an MPI source code program 362 and a command 364. Processing begins at "In Response to Command to Convert MPI Source Code Program to MPI Thread-Based Program, Examine MPI Source Code for Condition Indicating Problematic Code" step 410. In this step, converter 360 examines the MPI source code program 362 for several different conditions that are problematic when converting an MPI process to a thread. For example, some languages that are commonly used for building MPI applications, such as Fortran and C, provide memory management features that may not be handled properly by a thread running within a process. In Fortran, for example, data in a blank common block may vary in size and layout between different components or subroutines of the Fortran source code program. Data in the blank common block is a type of global variable that is shared among threads running within an MPI process. If each process were to be converted to a thread having its own version of the blank common block, the different sizes and layouts between different components may not be carried through to each component. Because a Fortran compiler typically compiles each component or subroutine separately, converter 360 would need to examine MPI source code for all components or subroutines to identify such problematic code.

To identify such a feature, converter 360 examines the MPI source code program for a condition where data in a blank common block has a first size when accessed by a first component of the MPI source code program and a second size when accessed by a second component of the MPI source code program, wherein the first size and the second size are different. Upon finding such a condition, converter 360 would identify such code as problematic for conversion to a thread-based implementation. Converter 360 may also examine the MPI source code program for a condition where data in a blank common block has a first layout when accessed by a first component of the MPI source code program and a second layout when accessed by a second component of the MPI source code program, wherein the first layout and the second layout are different. Upon finding such a condition, converter 360 would identify such code as problematic for conversion to a thread-based implementation.

Other types of problematic code for which converter 360 searches include code that saves data from one instance of a component to the next instance of the component. For example, Fortran provides a feature where a component may own variables that retain their values from one instance of the component to the next, regardless of whether the component is instantiated within the same thread. To find such a feature, converter 360 examines the MPI source code program for a component of the MPI source code program having a variable that retains a value from a first instance of the component to a second instance of the component. Upon finding such a condition, converter 360 would identify such code as problematic for conversion to a thread-based implementation.

Other types of problematic code for which converter 360 searches include code that depends on a state of the processor or its control words. For example, code that depends upon a processor operating in a particular state or with a particular control word to handle floating point operations may not properly convert to a thread-based implementation if the result of the program depends on different MPI processes working with differing settings of the processor. Upon finding such a condition, converter 360 would identify such code as problematic for conversion to a thread-based implementation.

In response to finding a condition indicating problematic code for conversion to a thread-based implementation, converter 360 proceeds to the "yes" branch of "Condition Indicating Problematic Code?" decision point 420. Control proceeds to "Reject Command to Convert MPI Source Code Program and Generate Object Code for MPI Source Code Program Normally" step 425. The command to convert the MPI source code program in response to finding the condition is rejected, and object code for the MPI source code program is generated normally. In another embodiment, rather than generate the object code for the MPI source code program, converter 360 may reject the command to convert the MPI source code program and terminate without producing an executable version of the MPI source code program.

In response to finding no condition indicating problematic code, converter 360 proceeds to the "no" branch of "Condition Indicating Problematic Code?" decision point 420. Control proceeds to "Generate Object Code to Declare Global Variables of MPI Source Code Program as Thread Private Variables" step 430. At this step, converter 360 generates object code to declare each global variable of the MPI source code program as a thread private variable. The effect of such a declaration will be to create a separate private variable for each thread within a common parent process address space, similar to the thread private variables 212, 222, and 232 within common process address space 250 of FIG. 2. To ensure that the thread private variables are effective, each process that is instantiated by the MPI source code program should be instantiated by a corresponding thread in the MPI thread-based program produced by converter 360.

To ensure that threads are instantiated rather than MPI processes when the MPI thread-based program is executed, an appropriate library must be used to build an executable version of the MPI thread-based program. Control therefore proceeds from "Generate Object Code to Declare Global Variables of MPI Source Program as Thread Private Variables" step 430 to "Identify Appropriate Libraries to Build Executable Code" step 440. For example, each library used to build the executable version of the MPI thread-based program should support multi-threading. By using multi-threaded system libraries, the operating system can take advantage of the multiple cores within a multi-core processor to instantiate different threads to perform tasks, thereby speeding execution of the MPI thread-based program.

It is also envisioned that proper handling of MPI thread-based programs may require use of specific libraries to enable the conversion of MPI processes to threads. These libraries may include code to cause particular functionality to be invoked in initializing MPI processes or in establishing the MPI execution environment. For example, code within a library may be used to identify instantiation of a new process during execution of the MPI thread-based program. In response to identifying the instantiation of the new process, the library may invoke code to cause a corresponding thread for the MPI thread-based program to be instantiated. Instantiation of a new process may be identified as occurring in response to an MPI_Init command, which spawns an MPI process. Rather than spawning a new MPI process, code for the MPI_Init command can instantiate a thread instead. The thread can then perform the functions that were to be performed by the MPI process being initialized in the original MPI source code program.

The thread that will perform the MPI functionality in place of an MPI process can be created either in response to an MPI_Init command or earlier when the MPI execution environment is established. For example, an mpiexec command may be used to initialize the MPI execution environment, and a number of threads can be instantiated in response to the mpiexec command. After the threads have been instantiated, when MPI_Init is called to instantiate a new process, code for the MPI_Init command can map one of the already existing threads to perform the functionality in place of the MPI process.

Another type of condition that may be problematic in a thread-based implementation of MPI processes is file input/output (I/O). When different processes read and write to a common file, typically a file system component of the operating system handles coordination of file I/O to ensure proper sequencing of operations by different processes. If these processes are converted to threads, attempts to access file I/O units or handles by different threads should be treated as if they were related to different files at the application level. Support from an appropriate library to handle coordination of file I/O may be required. Such a library might include code, for example, to identify an access to a first file by the first thread, cause the first thread to access the first file through a first file handle, identify an access to the first file by a second thread, and cause the second thread to access the first file through a second file handle, wherein the second file handle is different from the first file handle.

In the situation where problematic code was identified and the object code for the MPI source code program was generated normally, control proceeds from "Reject Command to Convert MPI Source Code Program and Generate Object Code for MPI Source Code Program Normally" step 425 to "Identify Appropriate Libraries to Build Executable Code" step 440. In this situation, the libraries that would be used need not have multi-threading capabilities, but rather should be the libraries normally required for building an executable version of the MPI source code program.

From "Identify Appropriate Libraries to Build Executable Code" step 440, control proceeds to "Use Identified Libraries to Build Executable Code" step 450. An executable version of the MPI source code program is built using the identified libraries. The executable version of the MPI source code program may be an MPI thread-based program if no problematic code was found, or the executable version may be built from the normally-generated object code for the MPI source code program if problematic code was found.

Once threads are instantiated rather than separate MPI processes, data can be transferred directly between threads as described with reference to FIG. 2, without the need to perform copy operations to and from a shared memory segment as described with reference to FIG. 1. Data may be transferred from the first thread to the second thread by providing contents of the first private variable directly to the second thread during execution of the executable version of the MPI thread-based program. This transfer of data from the first thread to the second thread does not use a shared memory segment to transfer the data.

The conversion process performed by a converter in accordance with the present invention is automatic. No changes to the source code for MPI source code program 362 of FIG. 3 are required in order to produce an executable program using threads in the form of MPI thread-based program 366. By automatically converting to MPI source code program 362 to a thread-based paradigm, MPI thread-based program 366 can take advantage of the threading functionality provided in multiprocessor environments as well as other efficiencies for data transfer among threads. This automatic conversion is in contrast to the techniques typically required today to convert MPI source code programs to use threading functionality by rewriting the MPI source code program described above. For example, in an attempt to achieve MPI functionality in a shared memory or cluster environment, researchers at the University of California Santa Barbara have developed techniques called TMPI that include both compile-time and run-time support for threading in an MPI environment. The compile-time transformation adopts thread-specific data structures to eliminate the use of global and static variables in C code. The run-time support includes a point-to-point communication protocol based on a lock-free queue management scheme. However, source code programs must be modified to make use of this point-to-point communication protocol, and automatic conversion of unmodified source code programs to run in an MPI environment using threading functionality is not possible.

Figure 5:
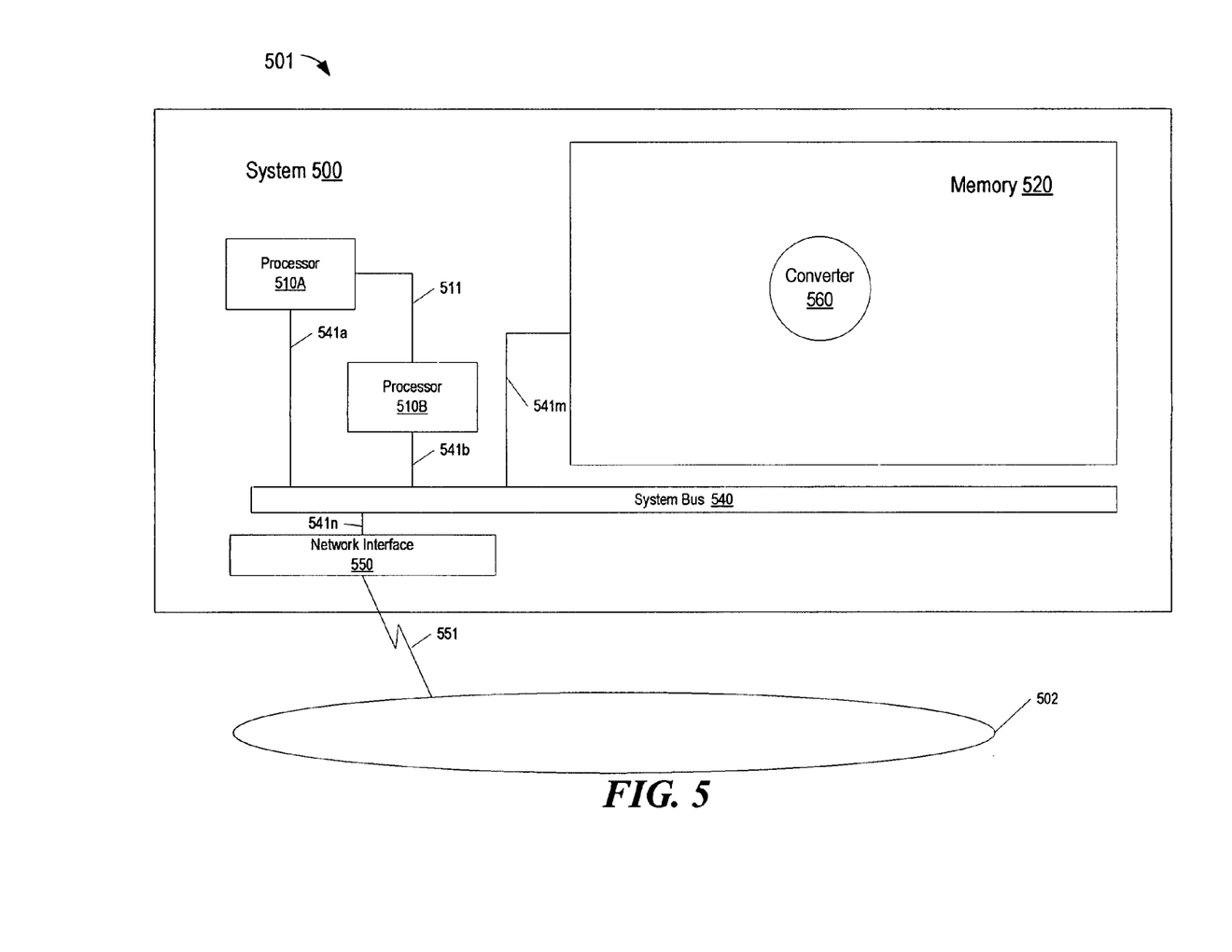
FIG. 5 is a block diagram depicting a suitable data processing environment in which certain aspects of an example embodiment of the present invention may be implemented.

FIG. 5 is a block diagram depicting a suitable data processing environment 501 in which certain aspects of an example embodiment of the present invention may be implemented. Data processing environment 501 includes a processing system 500 that includes one or more processors or central processing units (CPUs), shown here as processors 510A and 510B. One of skill in the art will recognize that, while two processors are shown, a single processor or any number of multiple processors may provide processor functionality to processing system 500. Each of processors 510A and 510B may be a single-core or a multi-core processor. Processors 510A and 510B are shown as communicatively coupled to various other components including a memory 520 via one or more system buses 540 or other communication pathways or mediums. Processors 510A and 510B are also shown as connected via a point-to-point processor interconnection 511, such as a HyperTransport link or an Intel QuickPath Interconnect (QPI).

A converter 560 converts an MPI source code program to an MPI thread-based program as described above with reference to FIGS. 3 and 4. Converter 560 may be implemented as instructions executed by processor 510A and/or processor 510B within memory 520.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 500 may be controlled, at least in part, by input from conventional input devices, such as keyboards, mice, etc., and/or by commands received from another machine, biometric feedback, or other input sources or signals. Processing system 500 may utilize one or more connections to one or more remote data processing systems (not shown), such as through a network interface controller (NIC) 550, a modem, or other communication ports or couplings.

Processing system 500 may be interconnected to other processing systems (not shown) by way of a physical and/or logical network 502, such as a local area network (LAN), a wide area network (WAN), an intranet, the Internet, etc. Communications involving network 502 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 500, processors 510A and 510B may be communicatively coupled to one or more volatile or non-volatile data storage devices, such as memory 520. Processors 510A and 510B are connected to memory 520 via system bus 540 and interconnections 541a, 541b, and 541m. Memory 520 may include random access memory (RAM), read-only memory (ROM), mass storage devices such as integrated drive electronics (IDE) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processors 510A and 510B may also be communicatively coupled to additional components, such as video controllers, small computer system interface (SCSI) controllers, network controllers, universal serial bus (USB) controllers, input devices such as a keyboard and mouse, etc. Processing system 500 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways. System bus 540 also provides access to a network interface 550 via interconnection 541n.

Some components, such as a NIC for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for automatically converting MPI source code programs to MPI thread-based programs. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method comprising:
in response to a command to convert a message passing interface (MPI) source code program to an MPI thread-based program:
examining the MPI source code program to determine whether a first condition is present, wherein the first condition is associated with data in a blank common block having a first size when accessed by a first component of the MPI source code program and having a second size when accessed by a second component of the MPI source code program, wherein the first size differs from the second size;
in response to determining that the first condition is present, rejecting the command to convert the MPI source code program; and
in response to determining that the first condition is absent, performing, by a converter executed by a first processor:
declaring a global variable of the MPI source code program as a thread private variable to create a first private variable for a first thread and a second private variable for a second thread;
identifying a library to use to build an executable version of the MPI thread-based program;
building the executable version of the MPI thread-based program using the identified library, wherein the identified library includes code that during execution of the MPI thread-based program is to perform:
identify an access to a first file by the first thread;
cause the first thread to access the first file through a first file handle;
identify an access to the first file by the second thread; and
cause the second thread to access the first file through a second file handle, wherein the second file handle is different from the first file handle; and
transferring data from the first thread to the second thread by providing contents of the first private variable directly to the second thread during execution of the executable version of the MPI thread-based program on a second processor.

2. The method of claim 1, wherein transferring the data from the first thread to the second thread does not use a shared memory segment to transfer the data.

3. The method of claim 1, wherein the identified library supports multithreading.

4. The method of claim 1, further comprising:
examining the MPI source code program to determine whether a condition is present, wherein the condition is associated with data in a blank common block having a first layout when accessed by a first component of the MPI source code program and having a second layout when accessed by a second component of the MPI source code program, wherein the first layout differs from the second layout; and
rejecting the command to convert the MPI source code program in response to determining that the condition is present.

5. The method of claim 1, further comprising:
examining the MPI source code program to determine whether the MPI source code program includes a component having a variable that retains a value from a first instance of the component to a second instance of the component; and rejecting the command to convert the MPI source code program in response to determining that the MPI source code includes the component.

6. The method of claim 1, further comprising:
examining the MPI source code program to determine whether a condition is present, wherein the condition depends on a state of the first processor; and
rejecting the command to convert the MPI source code program in response to determining that the condition is present.

7. The method of claim 1, further comprising:
examining the MPI source code program to determine whether a condition is present, wherein the condition depends on a state of a control word for the first processor; and
rejecting the command to convert the MPI source code program in response to determining that the condition is present.

8. The method of claim 1, wherein the identified library includes code that during execution of the MPI thread-based program is to perform:
identify instantiation of a new process; and
in response to identifying the instantiation of the new process, cause a corresponding thread of the MPI thread-based program to be instantiated.

9. A system comprising:
at least one processor; and
a memory comprising instructions for a converter to execute on the processor to perform in response to a command to convert a message passing interface (MPI) source code program to an MPI thread-based program:
examine the MPI source code program to determine whether a first condition is present, wherein the first condition is associated with data in a blank common block that has a first layout when accessed by a first component of the MPI source code program and that has a second layout when accessed by a second component of the MPI source code program, wherein the first layout differs from the second layout;
in response to determining that the first condition is present, reject the command to convert the MPI source code program; and
in response to determining that the first condition is absent:
declare a global variable of the MPI source code program as a thread private variable to create a first private variable for a first thread and a second private variable for a second thread;
identify a library to use to build an executable version of the MPI thread-based program, wherein the identified library includes code that during execution of the MPI thread-based program is to perform:
identify an access to a first file by the first thread;
cause the first thread to access the first file through a first file handle;
identify an access to the first file by the second thread; and
cause the second thread to access the first file through a second file handle, wherein the second file handle is different from the first file handle; and
build the executable version of the MPI thread-based program using the identified library; and
transfer data from the first thread to the second thread by providing contents of the first private variable directly to the second thread during execution of the executable version of the MPI thread-based program on a second processor.

10. The system of claim 9, wherein the transfer of the data from the first thread to the second thread does not use a shared memory segment to transfer the data.

11. The system of claim 9, wherein the identified library supports multithreading.

12. The system of claim 9, wherein the instructions for the converter further comprise instructions to:
examine the MPI source code program to determine whether a condition is present wherein data in a blank common block has a first size when accessed by a first component of the MPI source code program and a second size when accessed by a second component of the MPI source code program, wherein the first size and the second size are different; and
reject the command to convert the MPI source code program in response to the condition being present in the MPI source code program.

13. The system of claim 9, wherein the instructions for the converter further comprise instructions to:
examine the MPI source code program to determine whether a component is present in the MPI source code program, the component having a variable that retains a value from a first instance of the component to a second instance of the component; and
in response to determining that the component is present in the MPI source code program, reject the command to convert the MPI source code program.

14. The system of claim 9, wherein the instructions for the converter further comprise instructions to:
examine the MPI source code program to determine whether a condition that depends on a state of the processor is present; and
reject the command to convert the MPI source code program in response to determining that the condition is present.

15. The system of claim 9, wherein the instructions for the converter further comprise instructions to:
examine the MPI source code program to determine whether a condition that depends on a state of a control word for the processor is present; and
reject the command to convert the MPI source code program in response to determining that the condition is present.

16. The system of claim 9, wherein the identified library includes code that during execution of the MPI thread-based program is to perform:
identify instantiation of a new process; and
in response to identifying the instantiation of the new process, cause a corresponding thread for the MPI thread-based program to be instantiated.

17. A computer program product comprising:
a non-transitory computer-readable storage medium; and
instructions in the non-transitory computer-readable storage medium, wherein the instructions, when executed in a processing system, cause a converter executing on the processing system to perform operations in response to a command to convert a message passing interface (MPI) source code program to an MPI thread-based program, the operations comprising:
examine the MPI source code program to determine whether a first condition is present, wherein the first condition is associated with data in a blank common block having a first size when accessed by a first component of the MPI source code program and having a second size when accessed by a second component of the MPI source code program, wherein the first size differs from the second size;

in response to determining that the first condition is present, reject the command to convert the MPI source code program;

in response to determining that the first condition is absent:
- declare a global variable of the MPI source code program as a thread private variable to create a first private variable for a first thread and a second private variable for a second thread;
- identify a library to use to build an executable version of the MPI thread-based program, wherein the identified library includes code that during execution of the MPI thread-based program is to perform:
  - identify an access to a first file by the first thread;
  - cause the first thread to access the first file through a first file handle;
  - identify an access to the first file by the second thread; and
  - cause the second thread to access the first file through a second file handle, wherein the second file handle is different from the first file handle; and
- build the executable version of the MPI thread-based program using the identified library; and transfer data from the first thread to the second thread by providing contents of the first private variable directly to the second thread during execution of the executable version of the MPI thread-based program on a second processor.

18. The computer program product of claim 17, wherein the transfer of the data from the first thread to the second thread does not use a shared memory segment to transfer the data.

19. The computer program product of claim 17, wherein the identified library supports multithreading.

20. The computer program product of claim 17, wherein the instructions for the converter further comprise instructions to:
examine the MPI source code program to determine whether a condition is present wherein data in a blank common block has a first layout when accessed by a first component of the MPI source code program and has a second layout when accessed by a second component of the MPI source code program, wherein the first layout differs from the second layout; and
reject the command to convert the MPI source code program in response to determining that the condition is present.

21. The computer program product of claim 17, wherein the instructions for the converter further comprise instructions to examine the MPI source code program to determine whether a component of the MPI source code program having a variable that retains a value from a first instance of the component to a second instance of the component is present; and
reject the command to convert the MPI source code program in response determining that the component is present.

22. The computer program product of claim 17, wherein the instructions for the converter further comprise instructions to perform:
examine the MPI source code program to determine whether a condition that depends on a state of the processor is present; and
reject the command to convert the MPI source code program in response to determining that the condition is present.

23. The computer program product of claim 17, wherein the instructions for the converter further comprise instructions to perform:
examine the MPI source code program whether a condition that depends on a state of a control word for the processor is present; and
reject the command to convert the MPI source code program in response to determining that the condition is present.

24. The computer program product of claim 17, wherein the identified library includes code that during execution of the MPI thread-based program is to perform:
identify instantiation of a new process; and
in response to identifying the instantiation of the new process, cause a corresponding thread for the MPI thread-based program to be instantiated.

* * * * *